Sept. 20, 1971     W. P. STRUMBOS     3,605,672
DIRECTIONAL CONTROL APPARATUS
Filed Dec. 2, 1968

*INVENTOR.*
William P. Strumbos

Sept. 20, 1971     W. P. STRUMBOS     3,605,672

DIRECTIONAL CONTROL APPARATUS

Filed Dec. 2, 1968     6 Sheets-Sheet 2

INVENTOR.
William P. Strumbos

Sept. 20, 1971 W. P. STRUMBOS 3,605,672
DIRECTIONAL CONTROL APPARATUS
Filed Dec. 2, 1968 6 Sheets-Sheet 6

INVENTOR.
William P. Strumbos

United States Patent Office 3,605,672
Patented Sept. 20, 1971

3,605,672
DIRECTIONAL CONTROL APPARATUS
William P. Strumbos, 85 Middleville Road,
Northport, N.Y. 11768
Filed Dec. 2, 1968, Ser. No. 781,303
Int. Cl. B63h *5/14, 25/06*
U.S. Cl. 114—166                    50 Claims

ABSTRACT OF THE DISCLOSURE

Directional control appartaus having a stationary open-centered steering or direction controller which uses the dynamics of a fluid flow over extensible portions of the controller wall rather than a bodily displacement of the controller itself to produce steering forces in a fluid medium. The controller comprises an open-ended structure having either an open or closed periphery and inflatable sector means associated with the controller walls to vary the configuration thereof. Means are provided to inflate the sectors in predetermined portions of the wall selectively to vary the configuration of the controller, thus changing the characteristics of the fluid flow thereover such that a force that can be used for directional control is produced. Inasmuch as this force can be produced in any quadrant of the open-centered controller, control of the vehicle can be effected in pitch and roll, as well as yaw. If an annular shaped controller is used, it can be employed as the duct for a ducted fan or ducted screw propulsion system. Because the controller uses the dynamics of a fluid flow to produce a force on it perpendicular to its direction of travel, it thus can also be utilized as an airfoil or hydrofoil.

---

This invention relates to a directional control apparatus for use in a fluid medium, and, more particularly, to directional control apparatus which utilizes a stationary open-centered direction controller having steering means in its periphery.

The directional control or steering of a vehicle in a fluid medium is commonly done by means of a foil-like plane or rudder interposed in the fluid flow. Forces normally are generated for steering by a physical displacement of the foil. Although the vane type rudder is the type most commonly in use, it is also well known in the prior art to use an annular rudder for steering. Because it has been found in powered vehicles that the steering action is accentuated if the rudder is located in the efflux of the propulsion means, the rudder is generally mounted in close proximity to the drive means. Also, because of its efficiency, the propulsion means are generally some type of screw propeller. It is also a well known expedient to enhance the effect of a propeller, and, incidentally, to shield and protect it, by encircling it within a ring properly shaped and proportioned. Such an encircling ring is shown and described for marine use in U.S. Letters Pat. No. 2,030,375, granted to L. Kort. The ring disclosed therein is gullet-like and flares forwardly and rearwardly from a medial portion of minimum diameter; and, in cross-sectional shape, the ring walls are of streamlined or hydrofoil contour. The ring is so assembled with the propeller that the plane in which the tips of the propeller blades rotate is substantially coincident with the vertical diameter of the circle of the ring wall at its narrowest. Such a ring is known in the shipbuildig industry as the "Kort nozzle." Kort nozzles in actual use in tugs, trawlers, and river cargo vessels have increased the efficiency of propulsion from 30 to 50 percent. This increase in efficiency is not so marked in larger, ocean-going vessels but, nevertheless, material improvements are possible in any type of craft fitted with screw propellers. Increased efficiency with a duct is obtainable also with air screws, of course, and screw efficiency remains high over a wider speed range with a properly shaped duct than without one. The usual steering means used with ducted propellers is a rudder located in the effluent of the propeller.

It is also a known expedient to mount such a propeller-encircling ring upon the rudder of the vehicle to thereby give it additional functional value as part of the steering apparatus. Such an arrangement for marine use is disclosed in U.S. Letters Pat. No. 119,584, granted to A. De Man. That marine steering gear is intended to control a vessel in yaw; an arrangement of an annular rudder in which control of the vehicle in pitch as well as yaw is obtained is the aircraft stabilizer shown in U.S. Letters Pat. No. 2,510,561, granted to F. de Laval. These prior art annular rudders obtain their steering effect by being pivotally displaced about the plane of rotation of the propeller.

The steering apparatus of my invention has a steering means or controller that is fixed relative to the vehicle and its propulsion means and thus differs from these prior art annular rudders that require a physical displacement to perform their function. The only moving parts in the controller of my invention are inflatable portions of the controller wall. Because of the efficiency of the arrangement, a preferred embodiment of my invention discloses the controller being used as the duct for a ducted propeller. Annular duct apparatus having inflatable wall portions are known in the prior art, for example, in U.S. Letters Pat. No. 2,948,111, granted to N. E. Nelson, but in those known apparatus an entire annular section of the duct rather than selected portions of the annular section as in my device are inflated to change the configuration of the rudder. It is to be noted, also, that the force produced in the referenced Nelson device is principally an axial force rather than a radial steering force. It is believed that the differences between my invention and the steering apparatus delineated in the prior art will be more readily appreciated if the objects of my invention are reviewed.

It is the principal object of this invention to provide improved directional control apparatus for operation in a fluid medium in which the steering forces are generated by changes in the fluid flow over a stationary open-centered direction controller rather than by a bodily displacement of the controller itself.

Another object of my invention is to provide an improved directional control apparatus in which steering forces are produced by a controlled inflation and deflation of elements of the direction controller. The inflation state of those elements controls the configuration of the walls of the controller such that the changes in configuration that produce a steering force are made substantially instantaneously with the expenditure of only small amounts of energy. The power requirements for steering, therefore, are provided by a relatively small source of pressurized fluid rather than by the steering engines and related apparatus required to move the conventional rudders in prior art designs.

It is another object of my invention to provide an open-centered direction controller in which a steering force may be produced in any quadrant of the controller such that a vehicle can be controlled in pitch and roll, as well as yaw, and thus a stabilizing as well as steering function can be provided.

A further object is to provide an open-centered direction controller in which a steering force is produced in any quadrant of the controller to enable accommodation to be made for movement of the vehicle caused by turbulence or heavy seas so the controller itself does not contribute to unwanted changes of direction. Also, by doing away with the unwanted movement produced in heavy weather in a turn by the steering action of the conventional rudder, the more controlled steering action of my invention not only reduces fuel requirements by eliminating such unwanted movements, but makes it possible to achieve higher average speeds under such conditions.

A yet further object of my invention is to provide an open-centered direction controller for vehicles that also can serve as an efficient wing or hydrofoil.

Yet another object of my invention is to provide an open-centered direction controller in which provisions can be made to allow it to be folded if required for stowage.

An object of my invention is the provision of an annular direction controller that can be used in vehicles as the duct for the propulsion screw to thus provide a ducted screw arrangement that not only protects the screw from damage and also improves its thrust at a given speed but, at the same time, eliminates the need for a conventional rudder and thus does away with the drag created thereby.

Another object is to provide an annular direction controller that can be used as the duct in a ducted screw propulsion system such that a substantially maximum steering force is provided when the vehicle is at a standstill or moving at low speeds and in which a steering force higher than that produced by a conventional rudder is obtainable in any speed range.

A further object is the provision of a highly efficient direction controller that is as efficient going astern as it is in forward movement.

It is another object to provide an open-centered direction controller in which the operating elements thereof may be located within the walls inside the periphery of the device itself to thus reduce the possibility of battle, collision, and other damage.

A yet further object of my invention is to provide an improved steering system that is more efficient than those in common use, is capable of more rapid steering action, is less expensive to install, is more precise in its operation, and which permits a major reduction to be made in the weight of the steering system.

Yet another object is to provide an improved steering system which can be retrofitted as a more efficient replacement for the conventional steering system without the requirement for a radical redesign or major alteration to the craft being retrofitted.

Another object is the provision of an annular direction controller that can be used as the duct in a ducted screw propulsion system and in which inflatable elastic sector members which provide the steering action of the controller are located in the wall of the duct substantially in the plane in which the tips of the propeller blades rotate such that the vibration and attendant vibratory noises produced by the tip pressure wave of the propeller are materially reduced and insulated from the structure of the vehicle.

Other objects and advantages will become apparent from the following description when taken in conjunction with the accompanying drawings in which.

Figure 1:
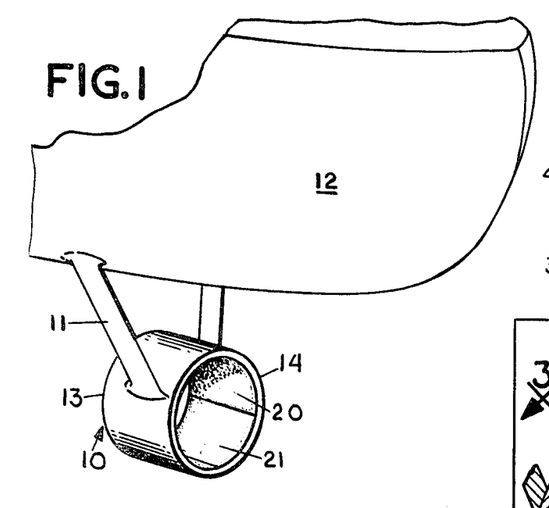
FIG. 1 is a view in perspective of a ship employing a direction controller of the present invention.

Referring to FIG. 1, in which is presented an embodiment of a direction controller of my invention, 10 represents a controller which is fixed in any suitable manner by struts 11 or similar support means to the craft 12 which is to be steered. A substantially circular, annular configuration is shown for controller 10, but as will be explained subsequently, the controller can also have any other open-centered, curvilinear or rectilinear configuration. Annular controller 10 has a leading edge 13 and a trailing edge 14 and comprises a substantially tubular rigid outer wall or shroud 15 and self-supporting, inflatable elastic sector members 16, 17, 18, and 19 whose outer wall surfaces 20, 21, 22, and 23 form the inside wall or duct 24 of the annular controller, as perhaps best shown in FIG. 2.

Inflatable sector members 16 through 19 may be fabricated from a natural rubber or rubber-like material. The particular material used should provide sufficient elasticity to permit substantial inflation of the member when pressurized by a fluid under pressure and a spontaneous return of the member to its unstretched state upon deflation. To insure that the sector members maintain their desired design configuration while they are inflated, webbing, limiting cords, or other contouring means well known in the art can be incorporated into the design. Typical examples of such known means in such extensible elastic structures are shown in U.S. Letters Pat. Nos. 2,504,684 and 2,948,111, granted to T. C. Harper and N. E. Nelson respectively. Each of the sector members 16 through 19 is bonded or otherwise suitably attached to the inside surface 25 of shroud 15 in a leak-tight manner such that each of the sector members forms a pressure-tight envelope. The sector members extend from the leading edge 13 to the trailing edge 14 of the controller and are disposed in a side-by-side arrangement around its inner periphery. Sector members 16 through 19 form quadrants of the annulus of controller 10 with their abutting longitudinal side walls 26 and 27, 28 and 29, 30 and 31, and 32 and 33 being located at an angular displacement of approximately 90 degrees from one another beginning at the top of the controller.

Figure 2:
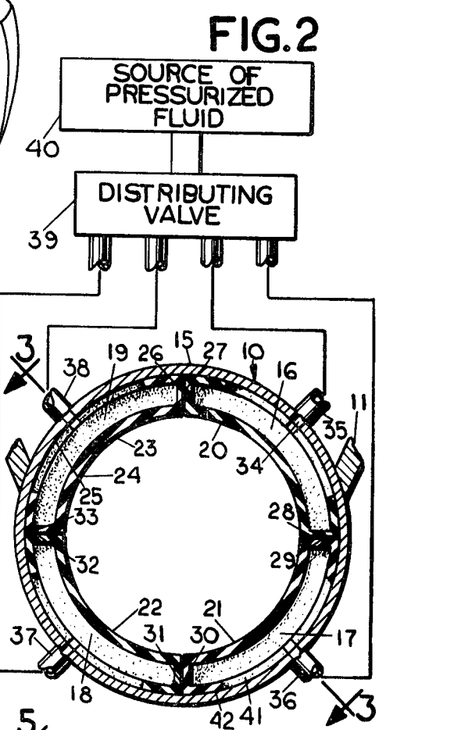
FIG. 2 is a rear view in section of the controller of FIG. 1 illustrating the device in the "amidship rudder" configuration, and showing diagrammatically a fluid supply and control unit as used in the operation of the device.

As will be discussed subsequently, a steering force is provided selectively by the controller by means of a controlled inflation and deflation of the inflatable sector members. Any suitable means for accomplishing this controlled inflation and deflation may be employed: a suitable fluid circuit for the purpose is illustrated in FIG. 2. As shown, each sector member 16 through 19 is connected by means of fluid passages 34 to supply conduits 35, 36, 37, and 38 which lead through distributing valve 39 to a suitable supply 40 of pressurized fluid. It will be obvious that distributing valve 39 can be in operational connection with the helmsman's steering control (not shown) or the valve can be integrated into the craft's autopilot or automatic steering system (not shown). Should a more rapid response be desired in the deflation of the sector members, the fluid circuit to the supply conduits 35 through 38 can incorporate means (not shown) to suck the fluid positively out of the members. To assure unobstructed passage of fluid into and out of the inflatable members, channels 41 radiating outward from fluid passages 34 to the extremities of each sector member in a known manner are provided in the wall 42 of each member.

Figure 3:
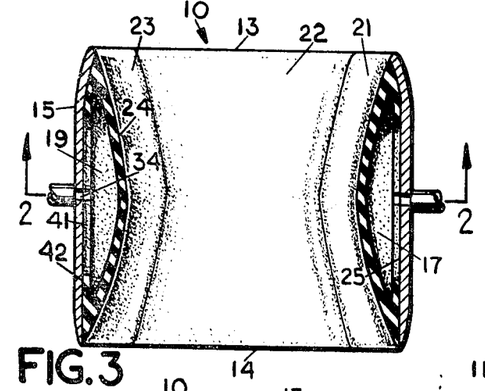
FIG. 3 is a view in section of the controller of FIG. 1 taken along line 3—3 of FIG. 2.

As stated above, the wall surfaces 20 through 23 of sector members 16 through 19 determine the configuration of the inside of the annulus. When in the deflated state, the annulus is substantially a straight sectioned duct (it will be obvious from FIGS. 3 and 5, however, that shroud 15 can have a slightly curved wall section to improve its efficiency); when the sector members are inflated, their shape will determine the configuration, and that configuration will be of a predetermined design that will be governed by the operating conditions to be encountered in service. The duct of this embodiment is shown as a convergent-divergent type; however, the configuration is for illustrative purposes only and it is not intended to represent any particular preferred design. Fluid flow through ducts and similar annular elements has been extensively studied and is relatively well understood; thus, it will be appreciated that the configurations of those direction controllers illustrated herein are merely by way of exposition only and are not intended as limitations on the configurations that may be used. However, it should be pointed out that in some applications of my invention such as in marine usage there may be a reverse flow through the controller under circumstances such as when a ship is backing; there thus may have to be some compromise made in the controller design to accommodate that factor. In other applications where a reverse flow factor may be neglected, the annulus can be shaped to control the fluid approaching it and also to form a nozzle to further increase exit jet velocity. It does not require emphasizing, of course, that the flow over the outer contour of the duct also influences over-all performance, so that aspect of the design should not be overlooked.

To afford a better understanding of my invention, the operation of the embodiment shown in FIGS. 1 through 5 will next be described. The forces produced on the controller 10 are largely determined by the shape of the duct, which, in turn, is governed by the state of inflation of sector members 16 through 19. Should those sector members be in the deflated condition when the craft is going ahead, controller 10 will act substantially like a straight-sectioned duct and the radial forces produced by it on the fluid in which it is operating will be balanced out and thus will be effectively cancelled. However, should the sector members be inflated when the craft is going ahead, the flow over the inside surface of the controller will have a higher velocity than the flow across the outer surface of the controller. This difference in velocity is caused by the fact that the fluid passing over the convergent-divergent curved inner surface 24 of the controller has a greater distance to travel than the fluid passing over the relatively straight surface of the outer wall 15 of the controller (see FIG. 3). According to Bernoulli's principle, the higher the velocity of a fluid over a surface, the lower the pressure. Further, the force resulting from this decrease in pressure acts substantially normal to the surface over which the fluid is passing. In an annular device such as the controller under discussion, the forces produced by this reduced pressure of the fluid flowing through the annulus will thus be directed radially inward toward the axial centerline of the controller. It will be apparent, therefore, that there will be a balancing of forces that will, in effect, result in their cancellation. With all sector members inflated equally, therefore, there is a cancellation of the forces produced radially by the controller 10 and the device can be considered to be in the amidship position.

Figure 4:
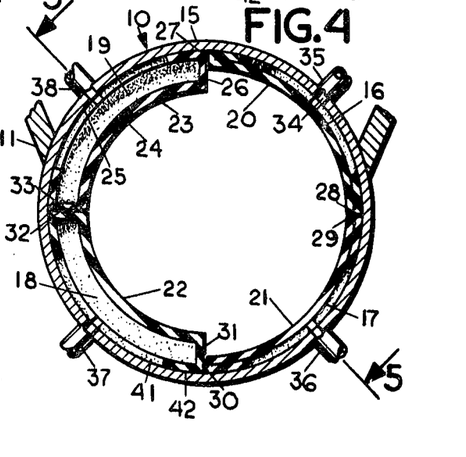
FIG. 4 is a rear view in section of the controller of FIG. 1 showing the device in the "left rudder" configuration.
Figure 5:
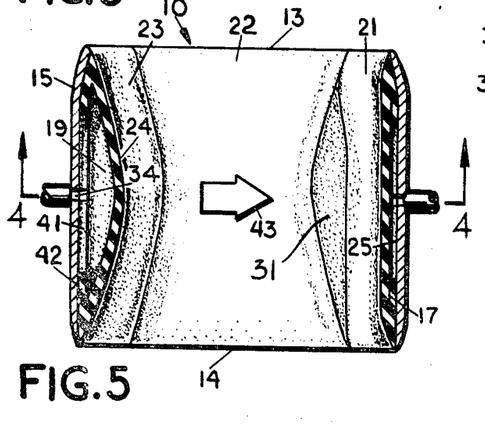
FIG. 5 is a view in section of the controller of FIG. 1 taken along line 5—5 of FIG. 4.

To make a turn, for example, to port, a "left rudder" position (not shown) is selected in the distributing valve 39. In the "left rudder" position, distributing valve 39 will be positioned to maintain fluid pressure through supply conduits 37 and 38 to keep sector members 18 and 19 inflated, but relieves the pressure through conduits 35 and 36 to permit sector members 16 and 17 to deflate. FIGS. 4 and 5 illustrate the "left rudder" condition with sector members 16 and 17 deflated and the other members inflated. With members 16 and 17 deflated, the flow over their inner surfaces 20 and 21 is essentially the flow over a straight-sectioned duct and the radial forces produced thereby are of a negligible value. The flow over curved surfaces 22 and 23 of members 18 and 19, however, has to travel further than the flow over the associated straight surface of shroud 15; this increased velocity on the inside of members 18 and 19 results in a lower pressure on the inside surface and a higher pressure on the outside. With the deflation of sector members 16 and 17, therefore, the forces that had tended to balance one another now become unbalanced. The forces being produced radially inward by sector members 18 and 19 are still being exerted, but the counterbalancing force that had been produced by sector members 16 and 17 now no longer exists—there thus is a resultant force as indicated by the directional arrow 43 in a direction from the axial centerline of the controller which passes through a point intermediate sector members 16 and 17. This produces a force in the direction of arrow 43 which moves the stern of the craft to starboard, thus turning the bow to port.

The sequence of operation for making a turn to starboard will be obvious from the above description of a turn to port. Briefly, in a turn to starboard, sector members 18 and 19 are deflated and members 16 and 17 are inflated, resulting in a force thrusting the stern of the craft to port to thus turn its bow to starboard. It will be obvious, also, that this annular steering system can be used to control a craft in pitch as well as yaw. Pitch control in marine craft has its most obvious application in the control of submarines, torpedoes, and similar underwater vehicles; however, it has value for surface craft also. For instance, if it is desired, especially with lightweight ships, to decrease the vessel's effective displacement, sector members 16 and 19 are deflated and members 17 and 18 are inflated, thereby producing a "lift" that tends to accomplish the desired function. Likewise, in conditions such as those in heavy seas, members 17 and 18 are deflated and members 16 and 19 inflated, yielding a downward force that keeps the aft end down and the propeller in the water.

Figure 6:
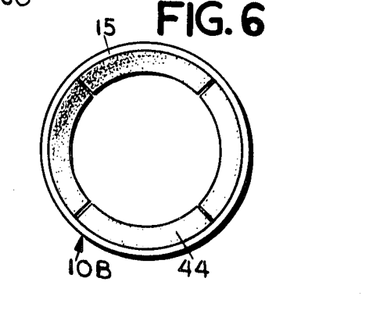
FIG. 6 is a front elevation of a controller of this invention showing an alternate configuration of the flow controlling elements of the device.
Figure 7:
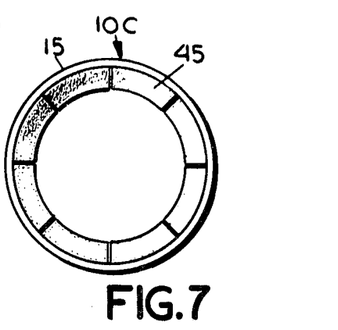
FIG. 7 is a front elevation of a controller of this invention showing another alternate configuration of the flow controlling elements of the device.

Although four sector members 16 through 19 arranged as described are employed in the embodiments of FIGS. 1 through 5, it will be apparent that an orientation of inflatable sector members 44 in any other arrangement, for example, as in a controller 10B of FIG. 6, may be utilized. It is also within the scope of this invention if, for reasons such as a desire for more precise control, an annular controller 10C incorporates a greater number of inflatable sectors 45 as shown in FIG. 7.

Figure 8:
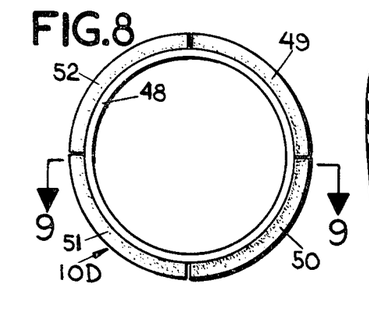
FIG. 8 is a rear elevation of a controller of this invention showing an embodiment of the device in the "amidship rudder" configuration.
Figure 9:
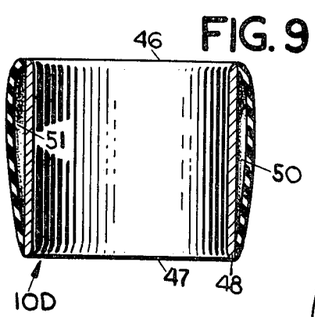
FIG. 9 is a view in section of the controller of FIG. 8 taken along line 9—9 of FIG. 8.
Figure 10:
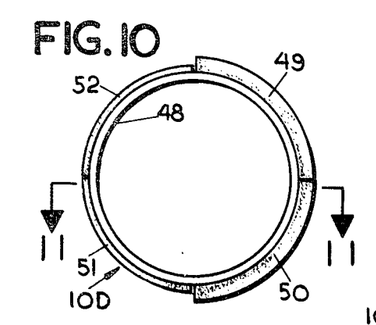
FIG. 10 is a rear elevation of the controller of FIG. 8 showing the device in the "left rudder" configuration.
Figure 11:
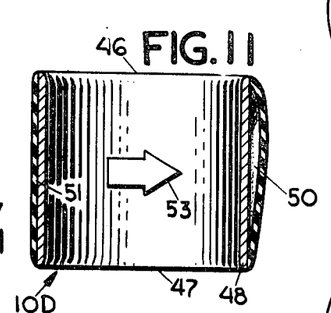
FIG. 11 is a view in section of the controller of FIG. 8 taken as on the line 11—11 of FIG. 10.

Should the design requirements of the vehicle in which this invention is to be used so dictate, the sector members can be located on the outside of the controller wall. Such configuration is illustrated in the embodiment of FIGS. 8 through 11 in which a controller 10D has a leading edge 46, a trailing edge 47, and comprises tubular duct 48, and inflatable sector members 49 through 52 arranged around the periphery of the duct. FIGS. 8 and 9 show controller 10D in the "amidship rudder" configuration. Inasmuch as this embodiment, with obvious differences, is identical in its construction and operation with the embodiment previously described, reference is made to that description for such details. In this embodiment, however, it should be noted that the "left rudder" configuration (see FIGS. 10 and 11) producing a force in the direction indicated by arrow 53, requires a diametrically opposite inflation state of the sector members than those embodiments having the sector members positioned inside the controller annulus.

Figure 12:
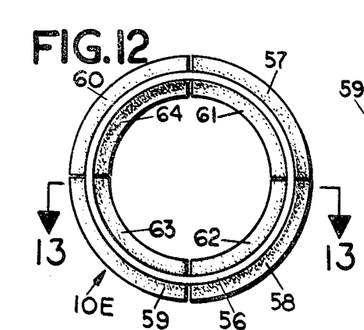
FIG. 12 is a rear elevation of a controller of this invention showing an embodiment in the "amidship rudder" configuration.
Figure 13:
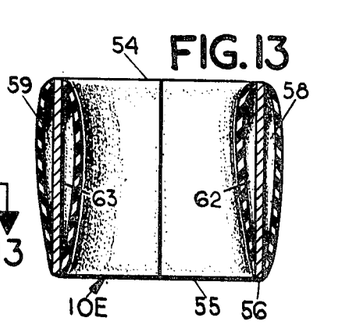
FIG. 13 is a view in section of the controller of FIG. 12 taken along line 13—13 of FIG. 12.
Figure 14:
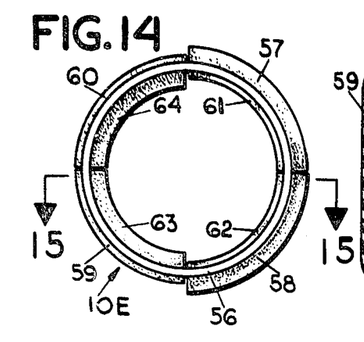
FIG. 14 is a rear elevation of the controller of FIG. 12 showing the device in the "left rudder" configuration.
Figure 15:
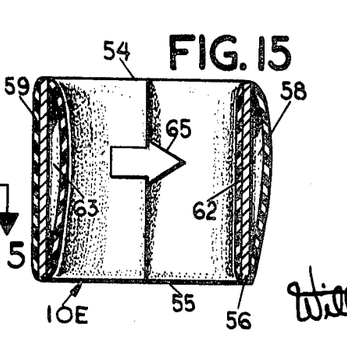
FIG. 15 is a view in section of the controller of FIG. 12 taken along line 15—15 of FIG. 14.

It will be appreciated that the sector members can be located both on the inside and outside surfaces of the controller wall structure. An embodiment with the sector members in that arrangement is shown in FIGS. 12 and 13 in the "amidship rudder" configuration. In that embodiment, controller 10E has a leading edge 54, a trailing edge 55, and comprises a rigid tubular duct or wall member 56, inflatable sector members 57 through 60 arranged around the periphery of the outside of the duct, and inflatable sector members 61 through 64 arranged around the periphery of the inside of the duct. Inasmuch as this embodiment also, with differences believed to be too obvious to be a source of confusion, is identical otherwise in construction and operation with the embodiments previously described, such description will not be repeated. In this embodiment, however, to turn to port, sector members 59, 60, 61, 62 are deflated, and sector members 57, 58, 63, and 64 are kept in their inflated state. As shown in FIGS. 14 and 15, this produces a force in the direction indicated by arrow 65 to thrust the stern of the craft to starboard, thus swinging the bow to port.

The forces involved in turning a ship in calm seas are fairly straightforward ones and the conventional rudder is reasonably efficient. In heavy seas, the forces become enormously complex and the performance of the conventional rudder leaves much to be desired. For example, should a ship have left rudder on and be turning to port in heavy seas, the effects of wave action are accentuated by the rolling and pitching of the ship. Under those conditions with full left rudder, should the craft roll to port, the rudder will tend to thrust the stern upward, resulting in a tendency for the bow to "bury" itself in the seas. This, of course, is an analogous situation to that experienced when an aircraft is turned; when rudder is applied to turn the craft, the outside wing, having increased speed, will lift, producing a roll in the direction of the turn. Should the rudder continue to be applied as the roll develops, the rudder force causes the nose to drop. In aircraft, the pilot has almost unlimited flexibility of control and can apply top rudder to restore the nose to the correct attitude and at the same time he can use the elevator to keep the craft turning. This flexibility is not available, of course, in a displacement vessel fitted with a conventional rudder.

Figures 16, 17, 18:
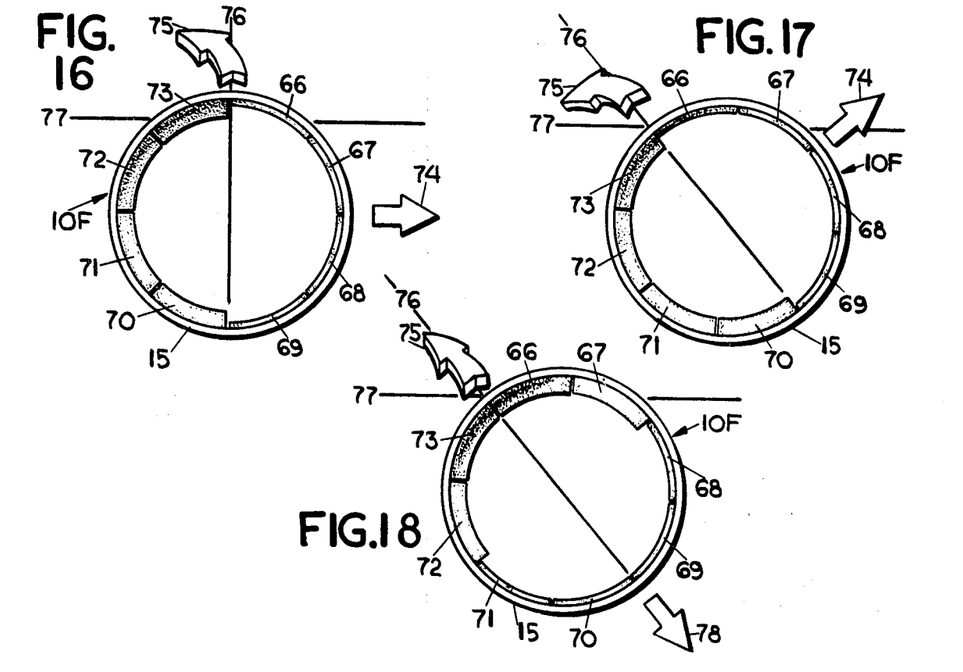
FIG. 16 is a rear elevation of a controller of this invention showing an embodiment in the "left rudder" configuration.
FIG. 17 is a rear elevation of the controller of FIG. 16 in the presence of wave action.
FIG. 18 is a rear elevation of the controller of FIG. 16 in a configuration for countering the wave action of FIG. 17.

However, this flexibility of control in the three principal axes of movement of the ship is attainable to a valuable extent with the instant invention, such as with the controller having more than four sector members. Such an embodiment of a controller, 10F, is shown in operation in FIGS. 16, 17, and 18. In FIG. 16, the sector members 66, 67, 68, and 69 are deflated and the other sector members 71, 72, 73, and 70 are inflated producing a force as indicated by directional arrow 74 causing the controller 10F to turn the ship (as shown by arrow 75) to port. Should the controller remain in this position and the ship develop a roll to port (as shown in a rather exaggerated form for clarity of exposition in FIG. 17, with the vertical centerline 76 of the ship being shown relative to the line 77 indicating the horizontal), controller 10F would act like a conventional rudder and the force developed by it as depicted by arrow 74 would have a tendency to cause the bow of the ship as indicated by arrow 75 to nose downward. However, unlike a conventional rudder, the controller of this invention is not limited to a fixed plane of operation. Thus, the helmsman or autopilot control means can "set" the controller 10F to continue the turn and yet, at the same time, contribute a force that can be used to help counteract the roll. Such use of controller 10F is shown in FIG. 18 in which the operating situation is identical to that depicted in FIG. 17 with the difference, however, that sector members 68, 69, 70, and 71 are deflated and the remaining sector members 66, 67, 72, and 73 are inflated. In this configuration, controller 10F will exert a force in the direction indicated by arrow 78 which will have a tendency to maintain the ship in the turn and simultaneously to provide a measure of force opposing the roll moment. The effectiveness of the controller 10F in providing a useful stabilizing force in addition to its steering action will be governed largely, of course, by the precision, speed of response, and related factors of the means provided to control and accomplish the inflation and deflation of the sector members which control the magnitude and direction of the force produced by the controller.

It is to be understood that the reaction of a ship to the forces produced by the controller of this invention will depend not only on the action of the controller itself, but also on other factors such as the size, design and trim of the ship, and the like, and thus the response of the ship or other craft to controller action as depicted in the drawings may or may not be representative of the response as it may occur and the drawings, therefore, are not intended to be a limitation on the invention.

Figure 19:
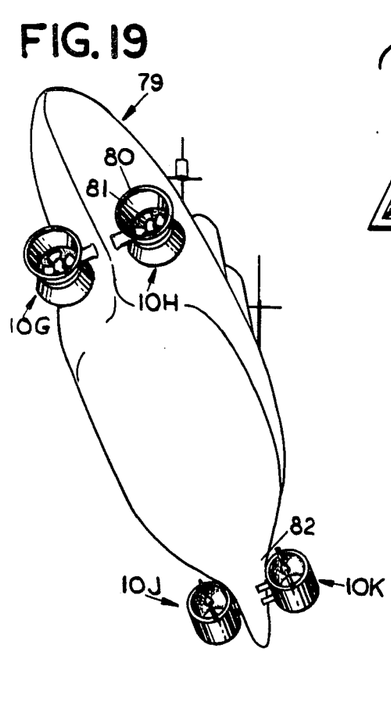
FIG. 19 is a view in perspective of a ship employing the invention for stabilizing as well as directional control functions.

In addition, it should be understood that the effective moment arm of a single, centrally positioned controller is not as efficient in serving a stabilizing function as would be a spaced arrangement of more than one controller. A more effective arrangement of more than one controller (10G, 10H, 10J, 10K) of this invention for stabilizing as well as steering a ship 79 is illustrated in FIG. 19. Aft controllers 10G and 10H can be integrated with the propulsion means to be the duct 80 of, in this example, screws 81. Forward controllers 10J and 10K perform a stabilizing function primarily but, if desired, can also be used in steering the ship. As with conventional vane-type stabilizers, controllers 10J and 10K can be designed to fold for stowage against the outer surface 82 of the bow of the ship, or they can be folded and then stowed internally in a recess (not shown) provided for them.

Figure 20:
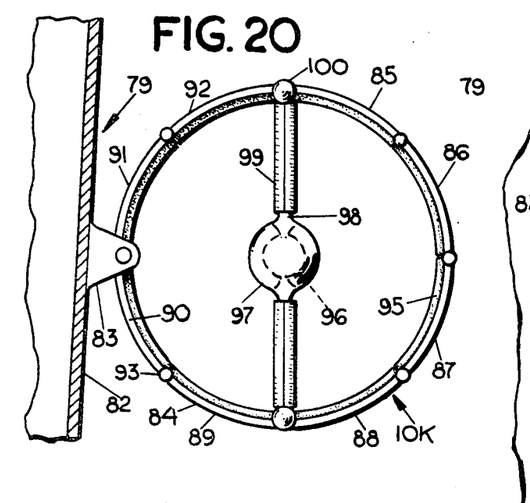
FIG. 20 is a rear elevation of a controller of this invention showing an embodiment of the device adapted for folding.
Figure 21:
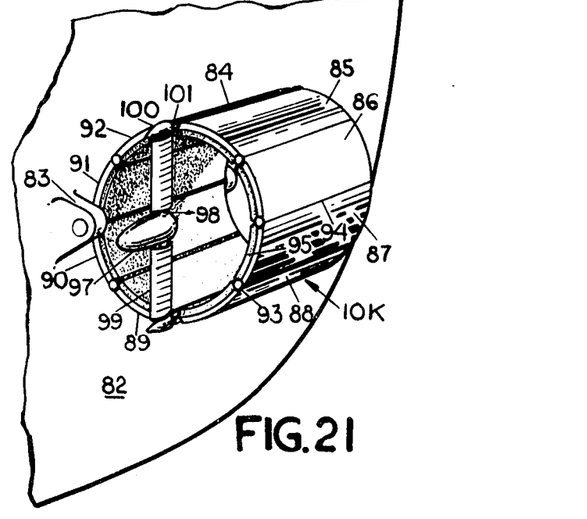
FIG. 21 is a rear view in perspective of the controller of FIG. 20.
Figure 22:
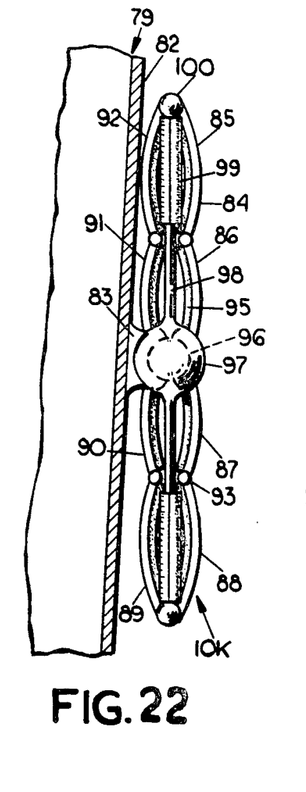
FIG. 22 is a rear elevation of the controller of FIG. 20 showing the device in the folded configuration.

Referring to FIGS. 20, 21, and 22 illustrating an embodiment of my invention which is adapted for folding, the controller 10K is fixed on the bow 82 or other suitable location of ship 79 by means of support structure 83. Inasmuch as the construction, operation, and the like, of controller 10J and 10K are identical, only controller 10K will be described. Supply conduits and other ancillary equipment (not shown) required for the operation of the controller may be conveniently routed through the structure 83. The rigid wall means or shroud 84 of controller 10K comprises eight arcuate sections 85 through 92 hinged together with longitudinal hinges 93. The hinge lines 94 about which the sections fold are located in the shroud 84 between each of eight adjoining sector members 95 such that the folding of the controller occurs without the hinging action requiring a folding or creasing of the sector members. The power for folding the controller is provided by any suitable means such as by hydraulic means having a hydraulic geared pump 96 which is contained in streamlined housing 97 located at one end of the controller. Pump 96 provides fluid under pressure to work suitable pistons (the piston connecting rods being indicated at 98) operating in hydraulic working cylinders contained in streamlined struts 99. Struts 99 are connected to knuckles 100, which, in turn, are connected to their associated hinges 93 of the shroud 84 by means of suitable fittings 101. It should be understood that the mechanism set forth herein for folding the controller is merely by way of example and other suitable actuators and linkage systems such as screw jacks and scissors arms are comprehended within the scope of this invention. To fold the controller from the operational position shown in FIGS. 20 and 21, gear pump 96 pumps hydraulic fluid into the cylinders contained in struts 99 thereby driving the struts outward in a direction away from the controller longitudinal axis. Because the struts are connected to the hinges 93 of the upper and lower portions of the shroud 84, the elongation of the struts results in sections 85 through 92 pivoting about their hinges such that sections 85, 86, 87, and 88 are drawn inward until they approach and nearly touch sections 89, 90, 91, and 92 as illustrated in FIG. 22. The unfolding action which restores the controller into the operating position is essentially the reverse of the folding action and it is not believed that it would serve any useful purpose to describe that action.

In the technology of vehicle propulsion in a fluid medium, ducted screws are coming into increasingly common use because of the increased efficiency attainable by a screw when it is equipped with a properly shaped duct. Because the annular version of the controller of my invention in many ways is substantially a duct, it is thus particularly adaptable for use as the duct in a ducted screw propulsion system. The ducted screw may be either an airscrew or a marine screw propeller and, while the fluid environment in which they are designed to operate have well-known differences in characteristics, the physical laws governing the operation of such devices in a fluid medium apply in either case after the usual design allowances have been made. Thus, a design feature shown in use with one embodiment can have equal utility with a different embodiment.

Figures 23, 24, 25, 26, 27, 28, 29, 30:
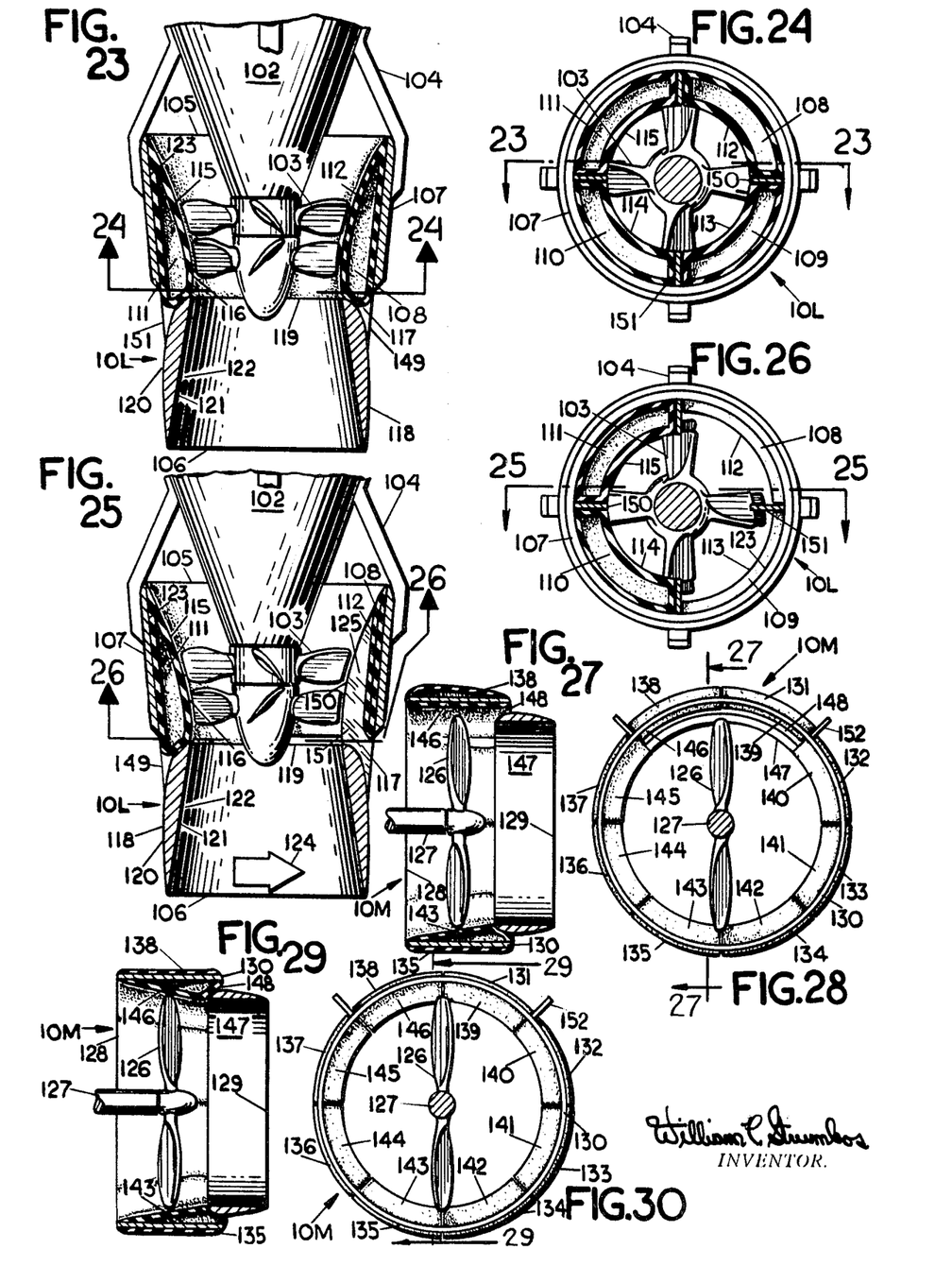
FIG. 23 is a top plan view of the tail end of a torpedo provided with a controller of this invention, with the controller shown in section in the "amidship rudder" configuration.
FIG. 24 is a view in section of the embodiment of FIG. 23 taken along line 24—24 of FIG. 23.
FIG. 25 is a top plan view partially in section of the torpedo of FIG. 23 showing the controller in the "left rudder" configuration.
FIG. 26 is a view in section of the embodiment of FIG. 23 taken along line 26—26 of FIG. 25.
FIG. 27 is a side elevation of an airscrew provided with a controller of this invention, with the controller shown in section in a configuration for providing a lifting force.
FIG. 28 is a front elevation of the embodiment of FIG. 27.
FIG. 29 is a side elevation partially in section of FIG. 27 showing the controller in the "centered control" position.
FIG. 30 is a front elevation of the embodiment of FIG. 27.

The use of this invention as the duct in a ducted screw arrangement for use with, for example, a torpedo is shown in FIG. 23 in which the torpedo 102 is propelled by counter-rotating screws 103. Acting for the duct for the screws 103, is an annular controller 10L which is rigidly mounted on the tail of torpedo 102 by means of suitable struts 104. Fluid lines and the like ancillary equipment (not shown) required for the operation of the controller may be routed conveniently through the struts 104. Annular controller 10L has a leading edge 105 and a trailing edge 106 and comprises a rigid tubular wall means or shroud 107 and inflatable sector members 108, 109, 110, and 111 whose outer wall surfaces 112, 113, 114, and 115 form when inflated substantially the convergent section 116 of the inner wall of the annulus, as perhaps best shown in FIGS. 23 and 25. Shroud 107 is slotted at 117; the annular slot dividing, in effect, shroud 107 to produce a secondary wall means or shroud 118 having a leading edge 119, a trailing edge at 106, a curved outer wall 120, and a substantially straight inside wall 121 which forms substantially the divergent section 122 of the inside wall of the controller. The relatively straight inside wall 121 and the curved outer wall 120 of secondary shroud 118, as shown in FIGS. 23 and 25, in effect, form an annular hydrofoil. Inflatable sector members 108 through 111 are substantially identical in construction to the sector members 16 through 19 discussed previously. Thus, each of the sector members 108 through 111 is bonded or otherwise suitably attached to the inside surface 123 of shroud 107 in a leaktight manner such that each of the sector members forms a pressure-tight envelope. The sector members extend from the leading edge 105 of the controller 10L to the leading edge 119 of secondary shroud 118 and are disposed in a side-by-side arrangement around the inner periphery of section 116 of the controller.

In this embodiment, any suitable structural means can be used to support secondary shroud 118 in its fixed relationship with shroud 107. I prefer to use an end-plate type structural member 151 having its forward edge portion fixed on the inside surface 123 of shroud 107 and its trailing edge portion 149 fixed to the forward portion of the curved outer wall 120 of secondary shroud 118. The inside edge 150 of member 151 is shaped to conform to the configuration of the sector members in their inflated state and sufficient clearance is provided so there is no danger of interference with the screws 103. When the sector members adjacent to their associated end plate member 151 are in their deflated state, the member 151 will project above the deflated sectors and thus serve as an end plate to improve the efficiency of the controller by reducing peripheral fluid circulation.

It will be obvious, because of the influence of screws 103, that the design characteristics of controller 10L will differ from those of the previously described embodiments. In operation, the screws provide a sternward projection of a column of water, this column being drawn in from forward and forced out aft. This movement of a column of water by the screws is, of course, an action that is independent of the movement of the vehicle—the screws can be moving a column of water at their maximum speed, and the vehicle itself can be stopped or even going astern. This phenomenon is utilized in my invention to obtain positive steering action even when the vehicle is moving at slow speeds or standing still. With a ducted screw, the screw drives water backward faster along the inside surface of the duct than the water is traveling because of motion of the vehicle along the outside surface of the duct. According to Bernoulli's principle, the higher the velocity of a fluid over a surface, the lower the pressure. In this ducted screw arrangement, therefore, this causes a lower pressure on the inside surface and, thus, results in a pushing force directed inwardly on the outside surface. It will be appreciated that, in the previously described embodiments of my invention, the controller had substantially foil-shaped sections and the increased velocity of the flow which resulted in the pressure drop which was used as the steering force was due to the greater distance of travel of the flow over the curved inner surface. The configuration of the foil section thus determined the amount and direction of the forces that were produced by the controller. In ducted flow, however, the increased velocity of the flow that results in the pressure drop which is used as a steering force is due to the screw; the shape of the duct has substantially nothing to do with the creation and direction of the forces produced and the only influence the shape has is to modulate the strength of the force. There thus would be a pressure drop in the duct even with a straight-sectioned tubular duct. It is believed that the following description of the operation of this embodiment of the invention will further the understanding of the phenomena involved.

In operation when the torpedo 102 is moving ahead and no steering action is required, sector members 108 through 111 are inflated and controller 10L forms a convergent-divergent duct for screws 103, as best shown in FIG. 23. Because screws 103 are driving water astern faster along the inside of the controller than the water over the outside surface is traveling due to the torpedo's motion, there is a lower pressure on the inside surface. The higher pressure on the outside surface thus produces a force directed toward the region of lower pressure; however, all the peripheral forces involved are directed radially inward toward the axis of the controller and there is a balancing of forces that, in effect, results in their cancellation.

Should it be required to make a turn, for example, to port, a "left rudder" position is selected in the distributing valve (not shown). Inasmuch as the fluid circuit and its operation for controlling the inflation and deflation of the sector members 108 through 111 is identical with that of the controller 10 embodiment, reference is made to the description of that embodiment for an understanding of the means provided for exercising that control. For a turn to port, sector members 110 and 111 will be retained in the inflated state, but sector members 108 and 109 will be deflated. With the deflation of sector members 108 and 109, the radially-inwardly directed forces that had tended to balance one another now become unbalanced. Because of the previously discussed action of screws 103, the flow over the wall surfaces 114 and 115 will have a higher velocity than that over the outer surface 107, thereby producing a force in the direction indicated by arrow 124. However, even though sector members 108 and 109 are deflated, because of the action of the screw, the flow over the duct inner surface 112 and 113 will tend to have a higher velocity than that over outer surface 107 of the controller, producing a force opposite to that indicated by arrow 124. It is well within the state of the art, however, to design a duct in which this counterforce is eliminated or reduced to an acceptable value and it is obvious that the design shown in FIGS. 23 through 26 is only one of many that can be comprehended within the scope of this invention. In this embodiment, it will be obvious that the flow produced by screws 103 over surfaces 112 and 113, because of the space 125 created between the blade tips of the screws and the wall surfaces 112 and 113 of the deflated sector members 108 and 109, will not be too much higher in velocity than that over outer surface 107. Furthermore, the deflation of sector members 108 and 109 opens up the throat of the duct 116 in the region of sectors 108 and 109, allowing the flow in that region to expand. This expansion, plus the screw current off the tips of the blades of screws 103 creates a flow through the open section of slot 117 such that there is a high velocity flow over the associated surfaces of secondary shroud 118. Because of the hydrofoil section of the shroud, the flow over its outer surface 120 will have a higher velocity than that over its inner surface 121, thus a force in the direction of arrow 124 is produced. This force is added to the force produced by inflated sector members 110 and 111 and the combined forces will produce a positive thrust that moves the stern of the torpedo to starboard, causing the bow to swing to port.

The sequence of operation for making a turn to starboard will be obvious from the above description of a turn to port. In a turn to starboard, of course, sector members 110 and 111 will be deflated and members 108 and 109 will be inflated, resulting in a force thrusting the stern of the torpedo to port to thus swing its bow to starboard. It will also be obvious that this embodiment, like the other embodiments of the invention, can be used also to control the torpedo in pitch and roll as well as yaw.

FIGS. 27 through 30 illustrate my invention embodied in a ducted airscrew arrangement in which controller 10M serves as a duct for the airscrew 126 which is driven by propulsion means (not shown) by shaft 127. Annular controller 10M has a leading edge 128, a trailing edge 129, and a substantially annular rigid wall member 130 upon whose outer periphery are fixed inflatable elastic sector members 131 through 138 and upon whose inside periphery are fixed inflatable elastic sector members 139 through 146. The controller has a rigid secondary wall or shroud 147 which is separated from the main body of the controller by an annular slot 148. As best shown in FIG. 29, slot 148 is closed off by the inside sector members 139 through 146 when they are in their inflated condition. Secondary shroud 147 may be structurally joined to wall member 130 by relatively thin end plate elements (not shown, similar to end plates 151 of controller 10L. To reduce peripheral circulation of fluid on the outside of the controller, similar end plates 152 may be fixed on the outer surface of wall member 130 between outer sector members 131 and 132, and 137 and 138. As shown in FIG. 28, end plates 152 may be of a size to project above the sector members in their inflated state. It will be appreciated that end plates 152 may be located between any of the sector members, both on the inside and on the outside of the annulus. The location, size, and shape of the end plates will, of course, be governed by the requirements of the specific application. Should it be required, the end plates may be designed with relieved areas or cut-outs to provide operating clearance for the propellor tips or for other associated moving elements.

The operating principles of controller 10M are substantially similar to those of controller 10L when the usual allowances are made for the differences in the fluids in which they operate. Controller 10M differs, however, in having outer sector members 131 through 138 around its outer periphery. In their deflated state, they do not make any appreciable contribution to the operation of the controller, but in their inflated state, they provide a radially outward force because of their airfoil shape. Thus, as best shown in FIG. 27, should inside sector members 139 and 146 be deflated, the inflation of outer sector members 131 and 138 will give that region of the controller an airfoil shape and one which thus will contribute a lift force on the controller.

Figure 31:
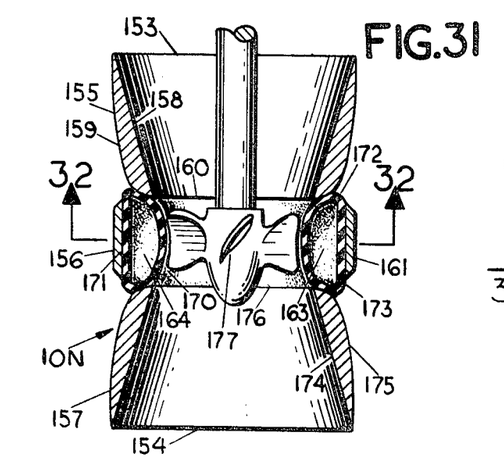
FIG. 31 is a top plan view of a marine screw propeller provided with a controller of this invention, with the controller shown in section in the "amidship rudder" configuration.
Figure 32:
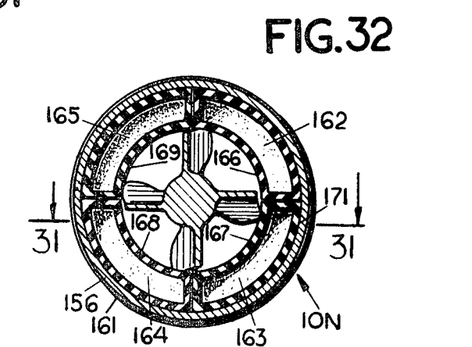
FIG. 32 is a view in section of the embodiment of FIG. 31 taken along line 32—32 of FIG. 31.
Figure 33:
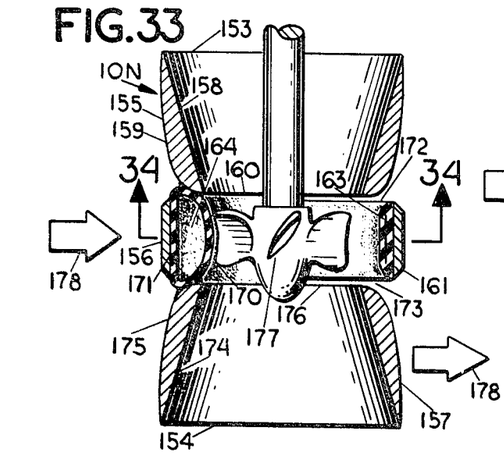
FIG. 33 is a top plan view partially in section of FIG. 31 showing the controller in the "left rudder" configuration.
Figure 34:
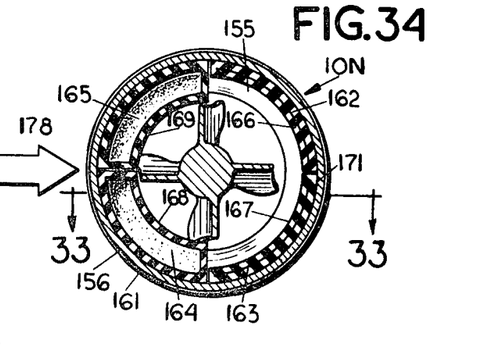
FIG. 34 is a view in section of the embodiment of FIG. 31 taken along line 34—34 of FIG. 33.

The use of a fluid foil sectioned secondary shroud to thus improve the efficiency of the controller can be adapted to produce a controller in which the design principle is utilized to improve the efficiency in conditions of reversed flow. As shown in FIGS. 31 through 34, controller 10N has a leading edge 153 and a trailing edge 154 and comprises a forward wall 155, a middle wall 156, and an aft wall 157. Rigid forward wall or shroud 155 has a relatively straight inside wall 158 and a curved outside wall 159 and in conditions of reversed flow through the duct, forward shroud has a leading edge at 160 and a trailing edge at 153. Rigid middle wall or shroud 156 comprises a tubular outer cowl 161 and inflatable elastic sector members 162 through 165 having outer wall surfaces 166 through 169 forming the throat 170 of the controller. Each of the sector members 162 through 165 is bonded or otherwise suitably attached to the inside surface 171 of middle shroud 156 in a leak-tight manner such that each of the sector members forms a pressure tight envelope. The sector members are disposed in a side-by-side arrangement around the inner periphery of the throat 170 of the middle shroud 156. Between forward shroud 155 and middle shroud 156 is an annular slot 172 and between the middle shroud and the rigid aft wall or shroud 157 is an annular slot 173. When sector members 162 through 165 are inflated, as best shown in FIG. 31, they close off slots 172 and 173 and also serve as the throat 170 of the inside wall of the duct. When deflated, the sector members retract to uncover slots 172 and 173. As explained in the description of the embodiment of controller 10L, the design and construction of the sector members are substantially similar to the sector members previously discussed and thus the description will not be repeated here. Aft shroud 157 has a relatively straight inside wall 174, a curved outside wall 175, a leading edge 176, and a trailing edge at 154.

In operation when no steering action is required, sector members 162 through 165 are inflated and controller 10N forms a convergent-divergent duct for propulsion screw 177 and the flow and pressure characteristics will be similar to those described for controller 10L. To make a turn to port, sector members 162 and 163 will be deflated, uncovering the associated areas of slots 172 and 173. Sector members 164 and 165 will remain inflated. As in the previously described embodiment, expansion of the flow because of the opened-up throat and the tip flow from screw 177 is enabled by the open area of slot 173 to flow over the associated portion of aft shroud 157, producing a force which augments the steering force furnished by inflated sector members 164 and 165. This augmented force produces a thrust that moves the stern to starboard and thus swings the bow to port, as indicated by directional arrow 178.

The same operating characteristics prevail when the ship is backing. To swing the stern of the ship to starboard, sector members 162 and 163 will be deflated, uncovering the associated areas of slots 172 and 173 and sector members 164 and 165 will remain inflated. The screw 177, however, is rotating in a direction opposite to that used to propel the ship forward and the current it generates through the duct will flow in a direction from the trailing edge 154 to the leading edge 153 of the controller. Thus, the flow which is being driven in a forward direction by the screw, because of the open area of slot 172 passes over the associated portion of forward shroud 155, producing a force in the direction of arrow 178. This augments the steering force furnished by inflated sector members 164 and 165 to move the stern of the ship to starboard. This embodiment, like the other embodiments of my invention, can be used, of course, to control a ship in pitch and roll as well as in yaw.

Figure 35:
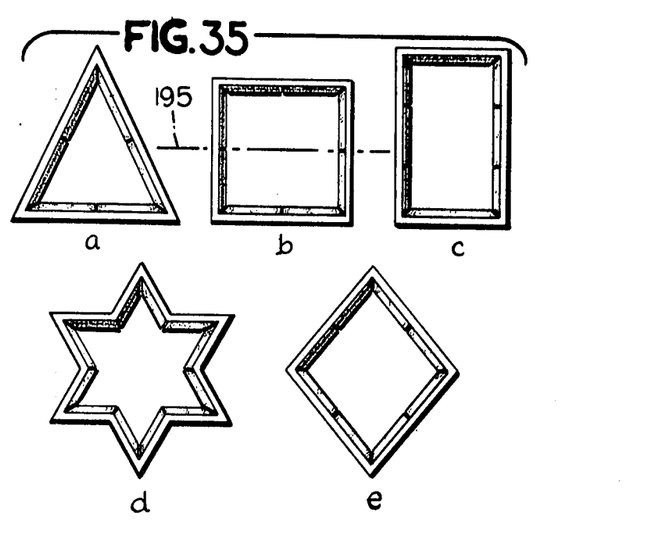
FIG. 35 shows front elevations of embodiments of the controller of this invention illustrating various rectilinear wall shapes.
Figure 36:
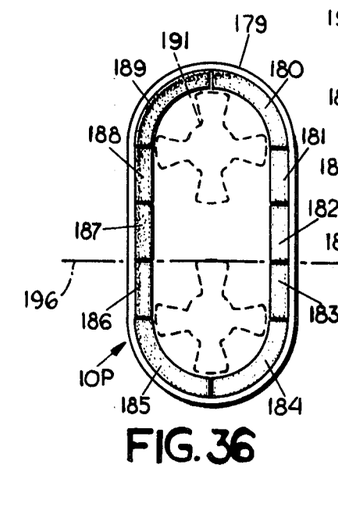
FIG. 36 is a front elevation of an alternate configuration of a controller of this invention.
Figure 37:
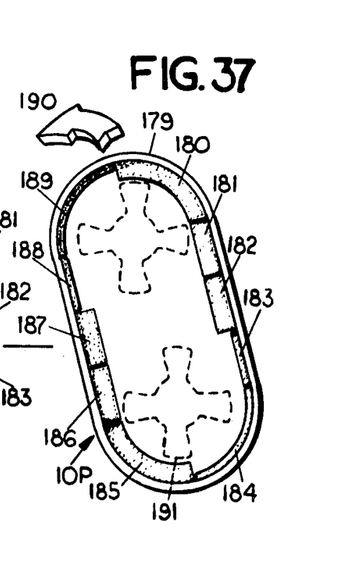
FIG. 37 is a front elevation of the controller of FIG. 36 in a configuration for producing a torque on the device.

Although an annular controller has structural advantages and is eminently suitable for use with a screw in a ducted screw arrangement, configurations other than the circular one can be used. Thus, any suitable open-centered structure having a closed curved-and/or straight-sided border may be employed in the direction controller of this invention. The controller can have a closed shape that is a straight-sided polygon having a triangular, square, rectangular, star, or diamond cross-section, as shown in FIG. 35, *a* through *e* respectively, or a closed curved elliptical cross-section, as shown in FIG. 36, or various combinations of those cross-sections. Although flow and structural considerations will, of course, govern the selection of the most effective configuration, an elongated shape such as the elliptical controller 10P shown in FIG. 36 will have advantages in roll control. For example, in that controller, having a rigid wall structure 179 and inflatable elastic sector members 180 through 189, should sectors 180, 181, 182, 185, 186, and 187 be inflated and sectors 183, 184, 188, and 189 be deflated (FIG. 37), the controller will produce a torque in the direction indicated by arrow 190. It will be obvious, therefore, that the designer has available a wide selection of controller configurations to fit the requirements of any specific application. It will also be apparent that elliptical controller 10P can be used as the duct in a multiple-screw arrangement, for instance, with twin screws 191 as indicated by the broken lines in FIGS. 36 and 37.

Although the emphasis in this specification and in the drawings of the direction controller of this invention has been placed on embodiments having an open-centered construction with a closed periphery, principally of an annular or ring design, controllers having less than a full annulus are implicit in the invention. Thus the direction controller can be of a channel-type whose walls are open and do not form a full annulus or circle. In other words, the controller can be formed of the lower half or other portion of a hollow and substantially cylindrical structure with the axis of the cylinder extending horizontally in substantial coincidence with the axis of the vehicle. If used with a propeller, the controller, of course, would have curved walls concentric with the axis of the propeller rotation and having a greater diameter than the circular path of the propeller so as to provide the necessary operating clearance. It will also be understood that the controller of this invention can be of any of the previously described embodiments cut in half or other proportion (such as, for example, on line 195 in FIG. 35*b* or line 196 in FIG. 36) or similarly sectioned along a longitudinal plane coincident with the controller axis. Thus, the controller can have rectilinear walls having a V or similar shape, or combinations of the curved and straight walled shapes, such as a U shape can be used. Inasmuch as a channel-type or open-walled direction controller operates in a similar manner as the closed-periphery controllers previously described with any differences being too obvious to be a source of confusion, a further description of such embodiments will not be given.

Figure 38:
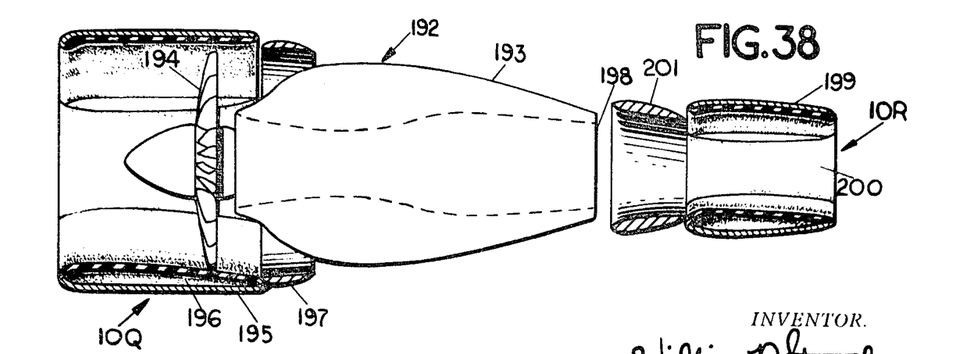
FIG. 38 is a side elevation of a gas turbine engine provided with controllers of this invention, with the controllers shown in section in a configuration for producing a lifting force.

It will be appreciated that this direction control apparatus can be used with any type of propulsion system producing an exhaust effluent under pressure. For example, FIG. 38 illustrates an embodiment of my invention in a propulsion system 192 commonly known as a high by-pass fanjet engine. Engine 192, as is known, comprises essentially a gas turbine 193 driving a forward fan 194. In this embodiment, engine 192 is provided with a controller 10Q, which acts as the duct for fan 194. Controller 10Q comprises a rigid wall or shroud 195, inflatable elastic sector members 196, and a secondary annular wall or shroud 197 that acts as a flow control vane. Engine 192 also is provided with a controller 10R located downstream of the exhaust nozzle 198 of turbine 193. Controller 10R comprises a rigid wall or shroud 199, inflatable elastic sector members 200, and an entrance wall or shroud 201. Controller 10R is of an annular configuration, but if the entrance shroud 201 is properly designed to maintain an efficient flow pattern through the controller, it can have any of the shapes shown in FIGS. 35 or 36. The operation and design characteristics of controllers 10Q and 10R are identical to those of embodiments already described and, thus, further discussion of FIG. 38 is not believed necessary. It will be noted, however, that the sector members in the upper quadrants of controllers 10Q and 10R are illustrated in their deflated state such that the controllers will provide a lifting force.

Although shown and described in what is believed to be the most practical and preferred embodiments, it is apparent that departures from the specific constructions shown will suggest themselves to those skilled in the art and may be made without departing from the spirit and scope of the invention. I, therefore, do not wish to restrict myself to the particular constructions illustrated and described, but desire to avail myself of all modifications that may fall within the scope of the appended claims.

Having thus described my invention, what I claim is:

1. Apparatus adapted to operate in a fluid medium for controlling the direction of movement of a vehicle, comprising at least one direction controller, said controller having with respect to its longitudinal axis an open-centered construction, extensible, inflatable wall means associated with said controller and extending from the leading to the trailing edges thereof to vary the configuration of selected sectors thereof, and a control system operable to extend said wall means to thus vary the fluid flow over said selected sectors, the variations in said flow producing a force on said controller which is used to control said direction of movement.

2. Apparatus as defined in claim 1 wherein the open-centered construction has a closed periphery.

3. Apparatus as defined in claim 1 wherein the open-centered construction has an open periphery.

4. Apparatus as defined in claim 1 wherein the wall of the open-centered construction has a rectilinear shape.

5. Apparatus as defined in claim 1 wherein the wall of the open-centered construction has a curvilinear shape.

6. Apparatus as defined in claim 1 wherein at least a portion of the wall of the open-centered construction has a rectilinear shape.

7. Apparatus as defined in claim 1 wherein the configuration of the longitudinal cross-section of the sectors is varied to vary the fluid flow thereover.

8. Apparatus as defined in claim 1 wherein there are at least a pair of sectors, one sector of each pair being located for operation diametrically opposite with respect to the longitudinal axis of the controller from the other sector of the pair.

9. Apparatus as defined in claim 1 wherein the extensible wall means associated with the controller to vary the configuration of selected sectors thereof are self-supporting inflatable elastic wall portions.

10. Apparatus as defined in claim 1 wherein the extensible wall means associated with the controller to vary the configuration of selected sectors thereof are self-supporting inflatable elastic wall portions of the exterior wall of said controller.

11. Apparatus as defined in claim 1 wherein the extensible wall means associated with the controller to vary the configuration of selected sectors thereof are self-supporting inflatable elastic wall portions of the interior wall of said controller.

12. Apparatus as defined in claim 1 wherein the extensible wall means associated with the controller to vary the configuration of selected sectors thereof are self-supporting inflatable elastic wall portions of the exterior and interior walls of said controller.

13. Apparatus as defined in claim 1 wherein the controller comprises a rigid wall, and a plurality of self-supporting, extensible, inflatable elastic sectors disposed in a side-by-side arrangement about the axis of said controller on at least one surface of said wall.

14. Apparatus as defined in claim 1 wherein the controller comprises a rigid wall, and a plurality of self-supporting, extensible, inflatable elastic sectors disposed in a side-by-side arrangement about the axis of said controller on the inside surface of said rigid wall, each of said sectors having at least a first and a second wall, one wall of each of said sectors being fastened to said inside surface such that the second wall of each of said sectors defines a portion of the interior wall of said controller.

15. Apparatus as defined in claim 1 wherein the controller comprises a rigid wall, and a plurality of self-supporting, extensible, inflatable elastic sectors disposed in a side-by-side arrangement about the axis of said controller on the outside surface of said rigid wall, each of said sectors having at least a first and a second wall, one wall of each of said sectors being fastened to said outside surface such that the second wall of each of said sectors defines a portion of the exterior wall of said controller.

16. Apparatus as defined in claim 1 wherein the controller comprises a rigid wall member and extensible, self-supporting, elastic interior and exterior walls made up of pluralities of inflatable sectors disposed in a side-by-side arrangement about the axis of said controller, each of said sectors having at least a first and a second wall, one wall of each of said sectors of said interior wall being fastened to the interior surface of said rigid wall member such that the second wall of each of said interior wall sectors defines a portion of the interior wall of the controller, and one wall of each of said sectors of said exterior wall being fastened to the exterior surface of said rigid wall member such that the second wall of each of said exterior wall sectors defines a portion of the exterior wall of said controller.

17. Apparatus as defined in claim 1 wherein the variation in the configuration of selected sectors of the controller varies said configuration of said sectors from a first state in which the forces produced by the flow over said sectors are balanced such that there is a substantial cancellation of said forces to a second state wherein said forces are unbalanced to thus produce a resultant force that can be used to control the direction of movement of the vehicle.

18. Apparatus as defined in claim 1 wherein at least one of the controllers is within operating proximity of the propulsion means of the vehicle.

19. Apparatus as defined in claim 1 wherein at least one of the controllers is located for operation in the propulsion effluent of the propulsion means of the vehicle.

20. Apparatus as defined in claim 8 wherein the forces produced by the fluid flow over the surfaces of the diametrically opposite sectors when both are in the same inflated state are substantially equal but oppositely directed such that they cancel out one another and wherein the forces produced by the fluid flow over the surfaces of said diametrically opposite sectors when one is inflated and the other is deflated is unequal, said inequality causing an unbalancing of the forces acting on the controller such that a resultant force is produced thereupon which is used to control the direction of movement of the vehicle.

21. Apparatus as defined in claim 13 wherein the rigid wall comprises longitudinally hinged sections, the hinge lines being located in the spaces between adjacent inflatable sectors, and means at each end of the controller pivotally engaging the ends of a pair of said longitudinal hinges diametrically opposite one another for moving simultaneously said hinge ends outwardly relative to the axis of the controller in a direction normal to said axis whereby the extension outward of said diametrically opposed hinge ends causes a movement inward of the other hinged portions of said controller toward the plane of said extension such that said controller is folded relatively flat.

22. Apparatus as defined in claim 13 wherein the controller is provided with end plates fixed on the rigid wall and interposed in the space between adjacent inflatable sectors, said end plates having a shape in plan view substantially matching the fluid controlling wall shape in the inflated state of the sectors, whereby said end plates protrude above said adjacent sectors in their deflated state such that they reduce peripheral circulation of the fluid flowing over the controller wall.

23. Apparatus as defined in claim 22 wherein the end plates are larger than the sectors such that they protrude above said sectors in their inflated state.

24. Apparatus as defined in claim 22 wherein the end plates are fabricated from a flat, relatively thin rigid material.

25. Apparatus as defined in claim 22 wherein the end plates are elongated longitudinally to extend beyond their associated inflatable sectors such that they serve as structural members to support elements of the controller.

26. Apparatus as defined in claim 23 wherein said end plates have cut-away portions to provide operating clearance for propellers and other moving elements associated with the controller.

27. Apparatus adapted to operate in a fluid medium for controlling the direction of movement of a vehicle having propulsion means, comprising an open-centered controller enclosing at least a portion of the effluent column from said propulsion means in sufficiently close proximity to experience a force from said effluent column, the axis of said controller being arranged in a fixed substantially parallel relationship with said effluent column and with the longitudinal axis of said vehicle, extensible, inflatable wall means associated with said controller and extending from the leading to the trailing edges thereof to vary the configuration of selected sectors thereof, and a control system operable to extend said wall means to thus vary the fluid flow over said selected sectors, the variations in said flow producing a force on said controller which is used to control said direction of movement.

28. Apparatus as defined in claim 27 wherein at least a portion of the wall of the controller has an arcuate shape.

29. Apparatus as defined in claim 27 wherein at least a portion of the wall of the controller has a rectilinear shape.

30. Apparatus as defined in claim 27 wherein said controller has an annular shape with a closed periphery.

31. Apparatus as defined in claim 27 wherein the propulsion means is at least one propeller and wherein said controller encloses at least a portion of the path of rotation of at least one of the propellers in sufficiently close relationship therewith to increase the propulsion efficiency thereof.

32. Apparatus as defined in claim 27 wherein the propulsion means is a propeller and wherein said controller has an annular shape with a closed periphery encircling the path of rotation of said prepeller in sufficiently close relationship therewith to increase the propulsion efficiency thereof.

33. Apparatus as defined in claim 14 wherein the longitudinal cross-section of the wall of the controller taken on a line through a sector when said sector is in its inflated condition has the shape of a fluid foil with one of its surfaces having more curvature and a longer length than the other of its surfaces.

34. Apparatus as defined in claim 15 wherein the longitudinal cross-section of the wall of the controller taken on a line through a sector when said sector is in its inflated condition has the shape of a fluid foil with one of its surfaces having more curvature and a longer length than the other of its surfaces.

35. Apparatus as defined in claim 16 wherein the longitudinal cross-section of the wall of the controller taken on a line through radially adjacent sectors positioned on the inside and outside surfaces of the rigid wall member when said sectors are in their inflated condition has a streamlined shape having first and second curved surfaces of substantially equal distance therearound and wherein the deflation of the sectors on one of the wall surfaces causes said cross-section to assume a fluid foil shape with one of its surfaces having more curvature and a longer length than the other of its surfaces.

36. Apparatus adapted to operate in a fluid medium for controlling the direction of movement of a vehicle having propulsion means, comprising an open-centered controller enclosing at least a portion of the effluent column from said propulsion means in sufficiently close proximity to experience a force from said effluent column, the axis of said controller being arranged in a fixed substantially parallel relationship with said effluent column and with the longitudinal axis of said vehicle, said controller having a rigid wall slotted in a plane perpendicular to the controller longitudinal axis to form first and second wall parts having a fluid passage therebetween, said second wall part having in longitudinal cross-section a fluid foil shape, extensible, inflatable wall means associated with said first wall part and extending from the leading to the trailing edges thereof to vary the configuration of selected sectors thereof, and a control system operable to extend said wall means to thus vary the fluid flow over said selected sectors, the variations in said flow producing a force on said controller which is used to control said direction of movement.

37. Apparatus as defined in claim 36 wherein the extensible wall means are a plurality of self-supporting, inflatable elastic sectors disposed in a side-by-side arrangement about the axis of the controller on at least one of the surfaces of the first wall part, and wherein said sectors close off when inflated associated areas of the fluid passage slot between said first wall part and the second wall part.

38. Apparatus as defined in claim 36 wherein at least a portion of the wall of the controller has an arcuate shape.

39. Apparatus as defined in claim 36 wherein at least a portion of the wall of the controller has a rectilinear shape.

40. Apparatus as defined in claim 36 wherein said controller has an annular shape with a closed periphery.

41. Apparatus as defined in claim 36 wherein the propulsion means is at least one propeller and wherein said controller encloses at least a portion of the path of rotation of at least one of the propellers in sufficiently close relationship therewith to increase the propulsion efficiency thereof.

42. Apparatus as defined in claim 36 wherein the propulsion means is a propeller and wherein said controller has an annular shape with a closed periphery encircling the path of rotation of said propeller in sufficiently close relationship therewith to increase the propulsion efficiency thereof.

43. Apparatus adapted to operate in a fluid medium for controlling the direction of movement of a vehicle having propulsion means, comprising an open-centered controller enclosing at least a portion of the effluent column from said propulsion means in sufficiently close proximity to experience a force from said effluent column, the axis of said controller being arranged in a fixed substantially parallel relationship with said effluent column and with the longitudinal axis of said vehicle, said controller having a rigid wall having slots in a plane perpendicular to the controller longitudinal axis to form first, second, and third wall parts having fluid passages therebetween, said first and third wall parts having in longitudinal cross-section fluid foil shapes, extensible, inflatable wall means associated with said second wall part and extending from the leading to the trailing edges thereof to vary the configuration of selected sectors thereof, and a control system operable to extend said wall means to thus vary the fluid flow over said selected sectors, the variations in said flow producing a force on said controller which is used to control said direction of movement.

44. Apparatus as defined in claim 43 wherein the extensible wall means are a plurality of self-supporting, inflatable elastic sectors disposed in a side-by-side arrangement about the axis of the controller on at least one of the surfaces of the second wall part, and wherein said sectors close off when inflated associated areas of the fluid passage slots between said second wall part and said first and third wall parts.

45. Apparatus as defined in claim 43 wherein at least a portion of the wall of the controller has an arcuate shape.

46. Apparatus as defined in claim 43 wherein at least a portion of the wall of the controller has a rectilinear shape.

47. Apparatus as defined in claim 43 wherein said controller has an annular shape with a closed periphery.

48. Apparatus as defined in claim 43 wherein the propulsion means is at least one propeller and wherein said controller encloses at least a portion of the path of rotation of at least one of the propellers in sufficiently close relationship therewith to increase the propulseion efficiency thereof.

49. Apparatus as defined in claim 43 wherein the propulsion means is a propeller and wherein said controller has an annular shape with a closed periphery encircling the path of rotation of said propeller in sufficiently close relationship therewith to increase the propulsion efficiency thereof.

50. Apparatus as defined in claim 21 wherein the means for moving simultaneously the hinge ends outwardly is a hydraulic pump which provides fluid under pressure to hydraulic power cylinders acting on said hinge ends.

References Cited
UNITED STATES PATENTS

| | | | |
|---|---|---|---|
| 2,948,111 | 8/1960 | Nelson | 244—34 X |
| 3,244,135 | 4/1966 | Meyerhoff | 114—166 |

A. H. FARRELL, Primary Examiner

U.S. Cl. X.R.

115—42